(12) United States Patent
Nakamura et al.

(10) Patent No.: US 6,755,620 B2
(45) Date of Patent: Jun. 29, 2004

(54) INDEPENDENT ROTATIONAL SPEED CONTROL OF MULTI-STAGE VARIABLE SPEED COMPRESSOR

(75) Inventors: Hajime Nakamura, Kako-gun (JP); Junichiro Totsuka, Kako-gun (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 44 days.

(21) Appl. No.: 10/077,753

(22) Filed: Feb. 20, 2002

(65) Prior Publication Data

US 2002/0119050 A1 Aug. 29, 2002

(30) Foreign Application Priority Data

Feb. 23, 2001 (JP) ........................................ 2001-048335

(51) Int. Cl.[7] .......................... F04B 41/06; F04B 25/00; F04B 49/00
(52) U.S. Cl. ............................ 417/2; 417/244; 417/286
(58) Field of Search ............................ 417/2, 244, 250, 417/251, 286, 288, 326

(56) References Cited

U.S. PATENT DOCUMENTS

| | | | | |
|---|---|---|---|---|
| 4,312,626 A | * | 1/1982 | Juran | 417/53 |
| 4,807,150 A | * | 2/1989 | Hobbs | 702/47 |
| 4,936,741 A | | 6/1990 | Blotenberg | |
| 5,174,729 A | * | 12/1992 | Waters et al. | 417/310 |
| 5,306,116 A | * | 4/1994 | Gunn et al. | 415/27 |
| 5,499,505 A | | 3/1996 | Gistau-Baguer | |
| 5,594,665 A | | 1/1997 | Walter et al. | |
| 6,056,510 A | * | 5/2000 | Miura et al. | 417/2 |
| 6,164,901 A | * | 12/2000 | Blotenberg | 415/1 |
| 6,174,137 B1 | | 1/2001 | Nakamura | |

FOREIGN PATENT DOCUMENTS

| | | | | |
|---|---|---|---|---|
| DE | 285 152 | | 12/1990 | |
| EP | 0 209 499 | * | 1/1987 | F04B/41/06 |
| GB | 2 164 093 | | 3/1986 | |
| JP | 9-250485 | * | 9/1997 | F04C/29/10 |
| JP | 10-82391 | | 3/1998 | |

* cited by examiner

*Primary Examiner*—Justine R. Yu
*Assistant Examiner*—Timothy P. Solak
(74) *Attorney, Agent, or Firm*—Oblon, Spivak, McClelland, Maier, & Neustadt, P.C.

(57) ABSTRACT

A multi-stage variable speed compressor includes a pressure detector provided for each compressor on and after the second stage for detecting a discharge pressure of a compressor of a stage preceding the corresponding compressor or a suction pressure of the corresponding compressor, wherein the control device controls the rotational speeds of the compressor of the first stage using a deviation of discharge pressure from a desired target pressure, and controls the rotational speed of each compressor on and after the second stage based on the discharge pressure of the compressor in a stage before each compressor or the suction pressure of each compressor, using a pressure signal from the pressure detector provided for each compressor on and after the second stage for detecting a discharge pressure of a compressor of a stage preceding the corresponding compressor or a suction pressure of the corresponding compressors.

13 Claims, 3 Drawing Sheets

(WHEREIN, K IS 2 TO n)

INDEPENDENT ROTATIONAL SPEED CONTROL OF MULTI-STAGE VARIABLE SPEED COMPRESSOR

BACKGROUND OF THE INVENTION

1. Field of the Invention

The present invention relates to a multi-stage variable speed compressor provided with a plurality of compressors.

2. Description of the Related Art

Recently, a multi-stage variable speed compressor has been known, of which an object is to obtain a desired pressure by serially connecting a plurality of compressors to increase pressure step by step, when the desired pressure cannot be obtained using one compressor. A method for controlling such a multi-stage variable speed compressor has already known from Japanese Laid-open Patent Publication No. Hei 10-82391. This technique is to obtain said target discharge pressure by setting a suction flow rate and a target discharge pressure in a multi-stage variable speed compressor provided with a two-stage compressor.

The control of this multi-stage variable speed compressor is intended to obtain the desired discharge pressure, in such a manner that values to be taken for each part of the multi-stage variable speed compressor, which are corresponding to said setting (for example, a mid-pressure between the two compressor stages, a rotation ratio of the two compressors, the rotational speed and etc.), are previously stored in a control device as operation data, and the control device of the multi-stage variable speed compressor determines operation data corresponding to said setting and controls the multi-stage compressor, so that each part of the multi-stage variable speed compressor is laid to these operation data values.

However, because a multi-stage variable speed compressor is subject to a secular change (for example, loss of gas-tightness, abrasion of bearing parts or the like) while being used and thus its specifications are changed, it may be impossible to obtain a desired pressure even if each part of the multi-stage variable speed compressor is controlled using operation data previously stored as explained in the above.

In addition, it is frequent that a compressor (including a multi-stage) is usually intended to obtain a desired discharge pressure. Accordingly, if a flow rate of working fluid is changed during the operation, the rotational speed of the compressor or the like should be changed in response to the change of flow rate so as to obtain said desired discharge pressure.

For that reason, if the control of a multi-stage variable speed compressor is performed using operation data as in the prior art, it is necessary to prepare operation data corresponding to a flow rate-changing width of working fluid for each of discharge pressures that the multi-stage variable speed compressor can output.

In particular, if it is possible for the multi-stage variable speed compressor to be controlled up to 75% of a flow rate-changing width with a 1% pitch of changing width for one discharge pressure, it is necessary to prepare 75 kinds of operation data. In addition, if it is possible to operate said multi-stage variable speed compressor at a discharge pressure in the range of 2 to 10 $kg/cm^2$ with a 0.1 $kg/cm^2$ pitch of pressure, it is necessary to prepare 80 kinds of operation data. Then, it is required to prepare 6000 (75×80=6000) kinds of operation data for the multi-stage variable speed compressor and is necessary to prepare a large amount of operation data.

Furthermore, if the multi-stage variable speed compressor is subject to a secular change as explained in the above said large amount of operation data cannot be used. Therefore, it is difficult to say that the prior art can endure a practical use.

SUMMARY OF THE INVENTION

Therefore, the present invention is conceived considering the above situation. It is an object of the present invention to provide a multi-stage variable speed compressor, wherein the compressors from the first stage to the final stage are controlled to obtain the desired target pressure.

In order to achieve the above object, the present invention provides a multi-stage variable speed compressor comprising:

a plurality of compressors of which the rotational speeds are variable and which are serially connected each other so that working fluid is compressed step by step;

a pressure detector for detecting a discharge pressure of the compressor of the final stage among said plurality of compressors; and a control device for controlling the rotational speeds of said plurality of compressors so that the discharge pressure of the compressor of said final stage among said plurality of compressors is laid to a desired target pressure, wherein said control device inputs a pressure signal detected by said pressure detector, calculates a deviation between said target pressure and said pressure signal, and controls the rotational speeds of said plurality of compressors using said deviation.

As constructed in this manner, the discharge pressure is always controlled to be the desired target pressure. Accordingly, it becomes possible to operate the multi-stage variable speed compressor with a discharge pressure of a good precision. In addition, it becomes possible to perform the control without needing operation data as used in the prior art at all.

The multi-stage variable speed compressor according to the present invention, further comprises a pressure detector provided for each of compressors on and after the second stage among said plurality of compressors and detecting a discharge pressure of a compressor of a stage preceding the corresponding compressor or a suction pressure of the corresponding compressor, wherein said control device can be constructed to control the rotational speed of the compressor of the first stage among said plurality of compressors using said deviation, to input a pressure signal from said pressure detector provided for each of compressors on and after the second stage among said plurality of compressors and detecting a discharge pressure of a compressor of a stage preceding the corresponding compressor or a suction pressure of the corresponding compressor, and to control the rotational speed of each compressor on and after the second stage among said plurality of compressors based on the discharge pressure of the compressor of a stage preceding the corresponding compressor or the suction pressure of the corresponding compressor.

Herein, it is preferred that said control device calculates the rotational speed of the compressor of the first stage among said plurality of compressors by PID (Proportional Integral Derivative) operation rather than the deviation of the discharge pressure of the compressor of the final stage from the target pressure. It is also preferred that said control device calculates the rotational speed of each of compressors on and after the second stage from a discharge pressure of a compressor of a stage preceding the corresponding compressor or a suction pressure of the corresponding compressor by PID operation.

In addition, said discharge pressure of a compressor of a stage preceding the corresponding compressor and the suction pressure of the corresponding compressor are substantially equal if a structure such as a throttle valve or the like which causes a change of pressure is not interposed between the preceding compressor and the corresponding compressor.

According to said construction, the control for allowing the discharge pressure of the final stage to be laid to the desired target pressure is performed with a good precision.

Also, the multi-stage variable speed compressor according to the present invention further comprises a pressure detector for detecting a discharge pressure of the corresponding compressor with regard to compressors except the final stage compressor among said plurality of compressors, wherein said control device can be constructed in such a manner as to feed-back control the rotational speed of a compressor of each stage based on a pressure deviation between a target discharge pressure given to a compressor of each stage and a pressure from the pressure detector for detecting said discharge pressure of each stage, for all of said plurality of compressors. Herein, it is preferred that said target pressure of the discharge pressure given to each stage is determined in connection to said target pressure of the discharge pressure of the final stage compressor.

Herein, it is preferred to construct in such a manner that said target pressure of the discharge pressure given to each stage is determined using said target pressure of discharge pressure of the final stage and a compression ratio of a compressor of each stage.

Further, in the multi-stage variable speed compressor according to the present invention, it is possible to construct said control device in such a manner as to determine the rotational speed of each compressor based on said deviation, for all of said plurality number of compressors, for all of said plurality of compressors, wherein the relationship between the rotational speeds of respective stages is previously set.

For example, it is possible to construct said control device in such a manner as to determine the rotational speed of the compressor of the first stage among said plurality of compressors based on said deviation, and to determine the rotational speed of each of the compressors on and after the second stage among said plurality of compressors based on data that previously set the relationship between the rotational speed of the compressor of the first stage and the rotational speed of each of the compressors on and after the second stage. Herein, it is preferred to construct in such a manner that the rotational speed of the compressor of the first stage is determined by performing PID operation of said deviation.

According to this construction, the rotational speeds of compressors of respective stages can be determined instantaneously at the same time, whereby the control has an immediate response characteristic.

Further, in the multi-stage variable speed compressor according to the present invention, it is possible to construct said control device in such a manner as to calculate a change rate of the rotational speed of compressor in the first stage among said plurality of compressors, and to be switched to determine the rotational speed of each compressor based on said deviation if said change rate is larger than a predetermined threshold value, for all of said plurality of compressors, wherein the relationship between the rotational speeds of respective stages are previously set.

According to this construction, the multi-stage variable speed compressor is controlled with a good precision by sequentially controlling the rotational speed of each compressor based on a discharge pressure of a compressor in a stage preceding the corresponding compressor or the suction pressure of the corresponding compressor if said change rate is small, while the control immediately responsive to the change is performed by determining the rotational speed of each compressor instantaneously at the same time based on the relationship between the rotational speed of said each stage if said change rate is large. In this manner, the control methods are precisely classified and used, as occasion requires, whereby the control capability of the multi-stage variable speed compressor is enhanced.

It is possible to construct the multi-stage variable speed compressor according to the present invention in such a manner that all or some of suction ports of said plurality of compressors are connected each other and each of interconnected conduit lines is provided with a control valve.

According to this construction, it is possible that the discharge pressure of the multi-stage variable speed compressor is laid to a target pressure using some of the compressors when it is not required to operate all of the compressors to obtain the desired target pressure. Due to this, it is economical because electric power to be consumed is suppressed as compared to the case that all of the compressors are operated.

In the multi-stage variable speed compressor according to present invention, it is possible to construct said control device in such a manner as to automatically stop said multi-stage variable speed compressor, when said multi-stage variable speed compressor is operated below the rotational speed at which it can normally operate.

Generally, in a compressor, if the rotational speed of a compressor is low, the working fluid may flow backward or stay within the compressor once compressed. In this case, there is problem in that if the working fluid is compressed again, the working fluid becomes a high temperature and aversely affects machines. However, the construction as explained in the above can solve said problem.

BRIEF DESCRIPTION OF THE DRAWINGS

The foregoing and other features of the present invention will become apparent to one skilled in the art upon reading the following description with reference to the accompanying drawings, in which.

DESCRIPTION OF THE PREFERRED EMBODIMENTS

Hereinafter, the embodiments of the present invention are explained in reference to the accompanying drawings to help the understanding of the present invention. However, the following embodiments are not intended to limit the technical scope of the present invention but illustrating examples for embodying the present invention.

Figure 1:
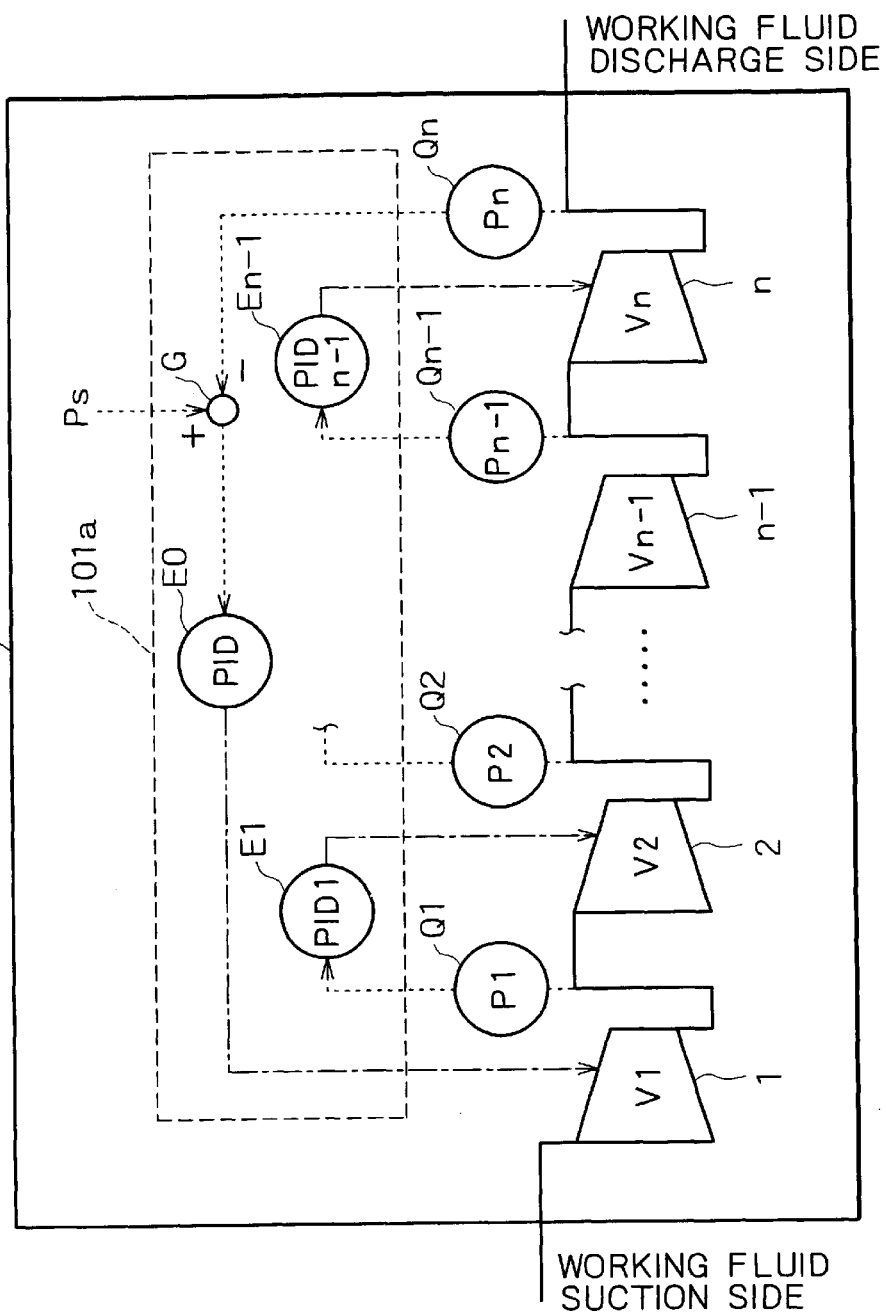
FIG. 1 is an outlined structural view of the multi-stage variable speed compressor according to the first embodiment of the present invention.
Figure 2:
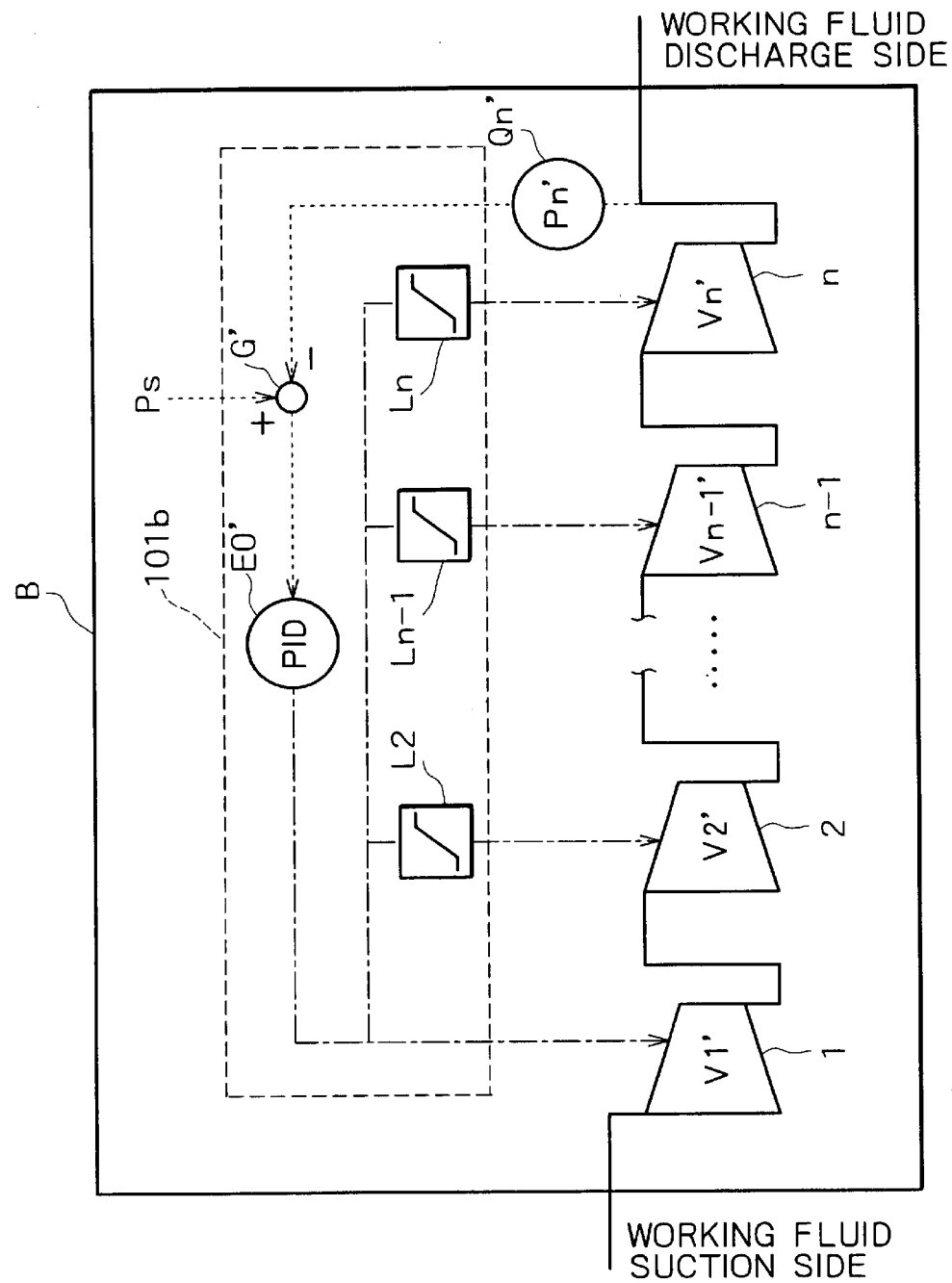
FIG. 2 is an outlined structural view of the multi-stage variable speed compressor according to the third embodiment of the present invention.
Figure 3:
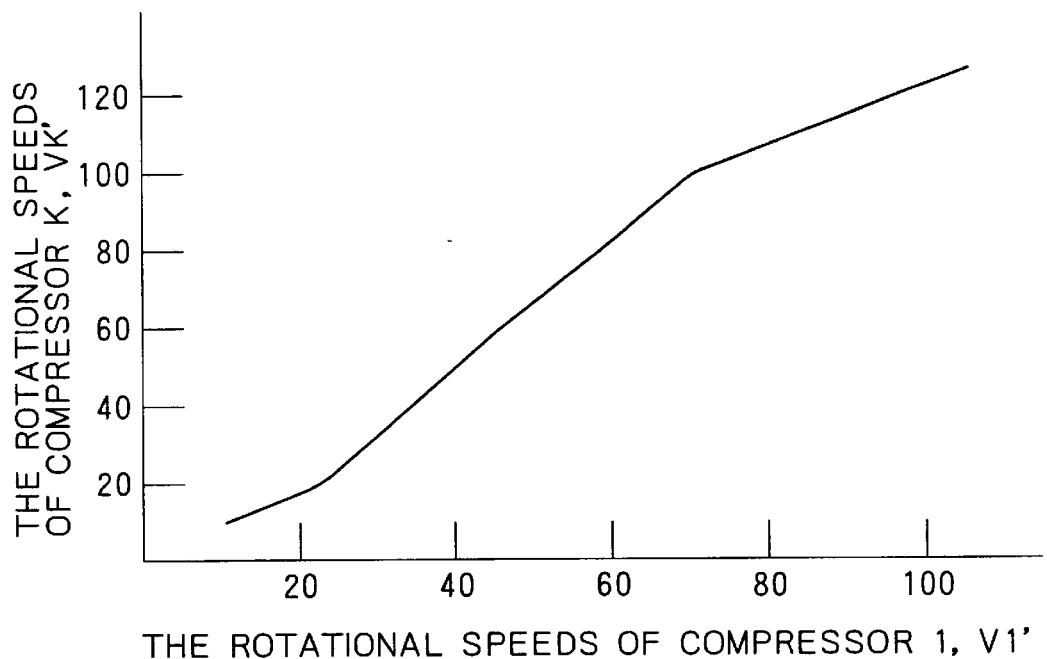
FIG. 3 is an illustration of data related to the third embodiment of the present invention.
Figure 4:
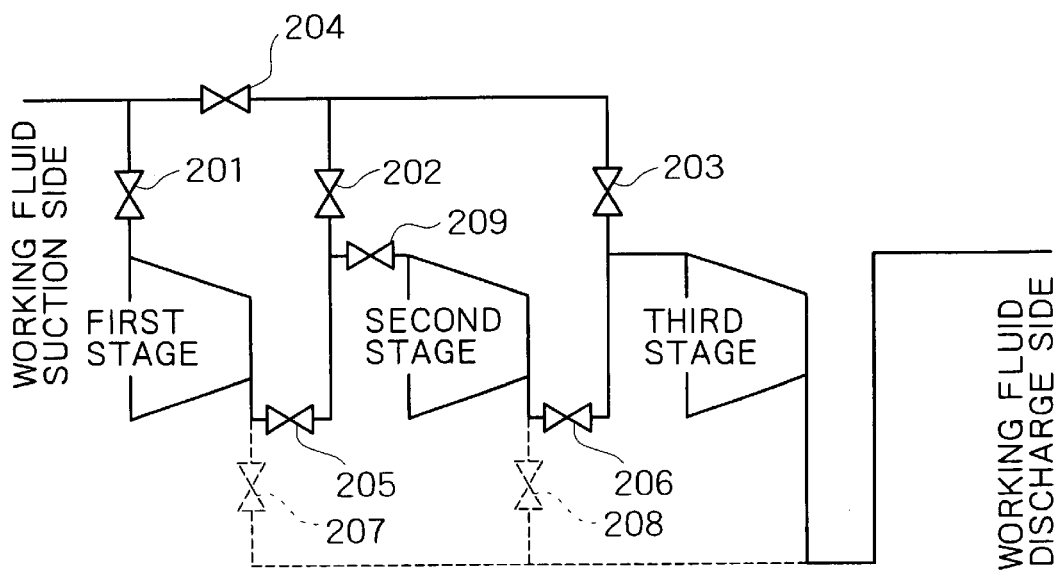
FIG. 4 is a view showing a modified example of the construction related to the present invention.

FIG. 1 is an outlined structural view of the multi-stage variable speed compressor according to the first embodiment of the present invention; FIG. 2 is an outlined structural view of the multi-stage variable speed compressor according to the third embodiment of the present invention; FIG. 3 is an illustration of data related to the third embodiment of the present invention; and FIG. 4 is a view showing a modified example of the construction related to the present invention.

First Embodiment

Referring to FIG. 1, the outlined construction of the first embodiment of the present invention is explained.

A multi-stage variable speed compressor A comprises n units of compressors 1 to n, n units of pressure detectors Q1 to Qn for detecting discharge pressures of the working fluid of the discharge port sides of compressors of respective stages, and a control device 101a for controlling the compressors 1 to n of said respective stages.

Within the control device 101a, E0 to En-1 which perform PID operation based on discharge pressures P1 to Pn detected in said pressure detectors Q1 to Qn to calculate the rotational speeds of compressors of respective stages are built-in as a circuit or a program.

Specifically, these E0 to En-1 are transfer functions obtained from operating tests and the like of the multi-stage variable speed compressor A.

In addition, G is a circuit or a program for calculating the difference between the discharge pressures of the multi-stage variable speed compressor A, Pn (i.e., the discharge pressure of the compressor n) and a desired target pressure, Ps, which is previously set, that is, the deviation of two pressures, and this will be referred as deviation calculating section.

The multi-stage variable speed compressor A constructed in this manner inhales the working fluid from the compressor 1 side, compresses the working fluid step by step toward the compressor n, and finally discharges the working fluid from the compressor n. Herein below, the method for controlling this multi-stage variable speed compressor A is explained.

The operation of the multi-stage variable speed compressor A is started, and the working fluid is inhaled from the working fluid suction side of the compressor 1 and compressed step by step while passing through the compressors 1 to n of respective stages, so that when the working fluid is discharged from the compressor n of the final stage, the pressure of the working fluid discharged from the compressor n of said final stage is detected by the pressure detector Qn. This detected discharge pressure is indicated as Pn.

The discharge pressure Pn detected by said pressure detector Qn is inputted into the deviation calculating section G, and the deviation between said target pressure Ps and said discharge pressure Pn is calculated.

As to the calculated deviation Ps and Pn, PID operation is performed by the transfer function E0, whereby the rotational speed V1 of the compressor 1 of the first stage is determined.

That is, the rotational speed of the compressor of the first stage is calculated based on the pressure of the compressor n of the final stage.

PID operation referred in the present invention does not mean only the operation that operates all of P motion, I motion and D motion. For example, all of the control operation methods, such as P motion only, or PI control or the like within the PID control range are included.

Next, the rotational speeds from the compressor 2 to the compressor n are determined as follows.

The discharge pressure of the compressor 1 that is on the way of being operated at the rotational speed V1 is detected as P1 in the pressure detector Q1.

As to the detected pressure P1, PID-operation is performed by the transfer function E1, the rotational speed of the compressor 2, V2 is determined, and the compressor 2 is driven at the rotational speed, V2.

That is, the rotational speed of the compressor 2, V2 is determined based on the discharge pressure of the compressor 1 (the compressor of the preceding stage) or the suction pressure of the compressor 2 (the compressor of the corresponding stage).

Regarding the rotational spaced of compressors 3 to n, PID operations are also performed based on the pressure of the working fluid discharged from a compressor of a preceding stage or the pressure of the working fluid inhaled by the compressor of the corresponding stage like the compressor 2, whereby the rotational speeds of the compressors are sequentially determined.

The working fluid compressed by compressors of respective stages, of which the rotational speeds were determined in this manner is discharged from the compressor n, and the discharge pressure is detected by the pressure detector Qn again and inputted into the deviation calculating section G.

Here, when a deviation exists, the aforementioned process for determining the rotational speeds is performed again, whereby the discharge pressure of the compressor n is controlled to be the target pressure Ps.

Although the rotational speeds of all of the compressors from the compressor 1 to the compressor n are determined by sequential PID operations, it is possible to partially apply such control. For example, it is possible to construct in such a manner that the rotational speeds are made to be constant from the compressor 1 to the compressor m (m<n), the rotational speed of the compressor m+1 is calculated from the deviation between Ps and Pn, and the rotational speeds from the compressor m+2 to the compressor n are determined by sequential PID operations as explained in the above. This construction falls within the scope of the present invention.

Second Embodiment

As an aspect different from the above, target (discharge) pressures of respective stages were also previously calculated for the compressors on and after the second stage (i.e., compressors 2 to n) likely that the desired target (discharge) pressure, Ps was previously set in the compressor of the final stage as a target value in the PID operations. The rotational speeds of the compressors of the respective stages are sequentially determined by performing PID operations as explained in the above so that deviations between the target (discharge) pressures and the actual discharge pressures of the compressors of the respective stages are not generated.

In addition, when said target (discharge) pressure is indicated, for example, as "PID operation setting value", this PID operation setting value is set based on the compression ratios of the compressors of the respective stages constituting the multi-stage variable speed compressor A. In particular, if it is assumed that the compression ratios of the compressors 1 to n are $\beta 1$ to $\beta n$ and the suction pressure of the first stage is the atmospheric pressure, it is preferable to previously determine the PID operation setting values R1 to Rn in the compressors 1 to n of the respective stages as the following equation 1

Equation 1

$Rn = Ps$ $Rk = \{(\beta 1 \times \beta 2 \times \ldots \beta k-1)/(\beta 1 \times \beta 2 \times \ldots \beta n)\} \times Ps (i \leq k \leq n-1)$ In the above construction, the set value (target discharge pressure) given to the compressor n is Ps, and directly the discharge pressure of the compressor n is controlled to be Ps, whereby it is possible to realize the target discharge pressure Ps as a multi-stage variable speed compressor. However, because each of compressors 1 to n-1 of respective stages is also controlled according to its own compression ratio, it is easy to control the compressor n so that its discharge pressure is to be Ps, whereby the control of target discharge pressure as a multi-stage variable speed compressor is performed with a high precision.

Third Embodiment

In said first embodiment, the rotational speed of the compressor of the first stage is determined, and then the rotational speeds of the compressors 2 to n are sequentially determined. However, in this embodiment, the rotational speeds of the compressors 2 to n on and after the second stage are determined based on data at the step that the rotational speed of the compressor 1 of the first stage is determined. The control method of this case is explained using FIGS. 2 and 3.

With respect to the construction, as shown in FIG. 2, the multi-stage variable speed compressor B is similar to the multi-stage variable speed compressor A of FIG. 1 in that it comprises n units of compressors 1 to n, a pressure detector Qn' for measuring the discharge pressure of the compressor n of the final stage, Pn', and a deviation calculating section G'.

Firstly, the operation of the multi-stage compressor B is started, and the working fluid is inhaled from the working fluid inlet side of the compressor 1, compressed step by step while passing through the compressors 1 to n of respective stages, and discharged from the compressor n of the final stage.

Like the first embodiment, the pressure of the working fluid discharged from the compressor of said final stage, Pn' is detected by the pressure detector Qn', the deviation between the target pressure, Ps and said discharge pressure Pn' is calculated in the deviation calculating section G', and PID operation is performed by the transfer function E0', whereby the rotational speed of the compressor 1 of the first stage, V1' is determined.

Herein, the control device 101b determines the rotational speeds of each of the compressors 2 to n based on data that correlated the previously set rotational speed of the compressor 1 with the rotational speeds of compressors 2 to n. These data are previously determined by test operations or the like.

In particular, as shown in FIG. 3, by determining the rotational speed of the compressor K (K is 2 to n) from data that correlated the rotational speed of the compressor 1 with the rotational speed of the compressor K in one to one relationship, the rotational speeds of compressors 2 to n are respectively determined to control the multi-stage variable speed compressor B.

In the cases that the flow rate of the working fluid has been largely changed, that the rotational speeds of the compressors of respective stages have been largely changed, and the like, it can be said that because the rotational speeds of the compressors of respective stages can be determined based on the rotational speed of the compressor 1, the control method has an immediate response characteristic can be performed.

If the multi-stage variable speed compressor is subject to a secular change, the data shown in FIG. 3 can be revised so as to correspond to the change.

In the above embodiment, the rotational speed of the compressor 1 is firstly calculated by PID operation of the deviation between Ps and Pn', and then the rotational speeds of the compressors 2 to n of respective stages are determined based thereon. However, because if the rotational speed of the compressor 1 is determined, the rotational speeds of the remainder compressors are determined in a moment, it can be considered that the rotational speeds of all of the compressors are simultaneously determined. That is, if the method of the above type is essentially accepted, the rotational speeds of all of the stages are determined based on the deviation between Ps and Pn', in which the relationship of the rotational speeds of respective stages are previously set. Accordingly, it is possible to make a variant in which the rotational speed of the compressor $m(1 \leq m \leq n)$ is firstly determined by PID operation of the deviation between Ps and Pn' and the rotational speeds of the compressors of respective remainder stages are determined based thereon.

Fourth Embodiment

As can be seen from the first and third embodiments as explained in the above, in a multi-stage variable speed compressor, a control with immediate response can be performed like the third embodiment, when the flow rate of working fluid has been largely changed, while the precision of control can be more improved if using a method as shown in the first embodiment, in a normal state such as conventional operation.

That is, it is preferable that a control device of the multi-stage variable speed compressor can perform both of the control methods indicated in the first and third embodiments and that it has a function that can judge which of the control methods shall be performed in the control.

Said judgment can be performed as follows.

The change of working fluid, discharge pressure, or the like may mean that the load of the compressor is being changed. That is, the rotational speed of the compressor is changed.

Therefore, it is sufficient that the control device of the multi-stage variable speed compressor monitors the change rate of the rotational speed of the compressor per unit time, performs the control in the method indicated in the first embodiment if it is judged that this change rate is larger than a predetermined change rate, and performs the control in the method indicated in the third embodiment if it is judged that this change rate is smaller than said predetermined change rate.

Herein, said predetermined change rate is a change rate that is used as a reference to judge whether the change rate of the rotational speed of the compressor is large or small, and previously set in said control device.

Although the control methods are converted depending on the charge rate of the rotational speed of the compressor in the above embodiment, it is also possible to construct so that the control methods are converted depending on parts of the multi-stage variable speed compressor. For example, it is considered that the compressors from the first stage to the $m^{th}$ stage are controlled in a method same with that of the third embodiment and the compressors from the $(m+1)^{th}$ stage to the $n^{th}$ stage are controlled in a method same with that of the first embodiment. According to this construction, it becomes possible to perform a control with a good balance of an immediate response and a good precision.

Next, another embodiment is explained in respect to a connected relationship between respective compressors constructing the multi-stage variable speed compressor. In a three-stage variable speed compressor, for example the suction sides of compressors of three stages may be connected each other as shown in FIG. 4 and further the discharge sides may be connected each other (as shown in dotted lines) so that one or two compressors among the three stages are utilized to use aforementioned methods, whereby a desired target value can be obtained.

In addition, conduit lines connected each other are provided with control valves 201~209, respectively.

For example, when the working pressure is compressed by driving the compressors of the first and third stages, the control valves 204, 206, 207, 208 and 209 are closed and the control valves 201, 202, 203 and 205 are opened. Then, the working fluid finds routes as follows.

The working fluid inhaled from the suction side finds a route: the control valve 201 → the compressor of the first stage → the control valve 202 → the control valve 203 → the compressor of the third stage, thereby being compressed.

By constructing the present invention in this manner, operating selectively some of the compressors is more economical to decrease the electric power consumption if it is not required to operate and control all of the compressors of three stages to obtain the target pressure.

In addition, beyond the embodiment shown in FIG. 4, compressors may be selectively operated, with the construction being connected among the suction sides or among the discharge sides of the compressors.

Furthermore, it is possible to provide following function in the multi-stage variable speed compressor. If the rotational speeds of compressors of respective stages are very small as compared to that at the time of rated operation, once compressed working fluid may flow backward due to its own pressure. The working fluid flown backward is compressed again in the compressor and has a very high temperature, whereby it may adversely affect the mechanism of the compressor.

Therefore, it is possible to construct in such a manner that if the multi-stage variable speed compressor is operated in the rotational speed lower than the previously set one, the control device of the multi-stage variable speed compressor may automatically stop the operation. In this manner, it is possible to exclude a factor adversely affecting the compressor.

We claim:

1. A multi-stage variable speed compressor comprising:
a plurality of compressors of which the rotational speeds are individually variable, said plurality of compressors being serially connected to each other so that the working fluid is compressed step by step;
a pressure detector for detecting a discharge pressure of the compressor of the final stage among said plurality of compressors;
a control device for controlling the rotational speeds of said plurality of compressors so that the discharge pressure of the compressor of said final stage among said plurality of compressors is set to a desired target pressure, wherein said control device receives a pressure signal detected by said pressure detector, calculates a deviation between said target pressure and said pressure signal, and individually controls the rotational speeds of said plurality of compressors using said deviation; and
a pressure detector provided for each compressor on and after the second stage among said plurality of compressors for detecting a discharge pressure of a compressor in a stage preceding the corresponding compressor or a suction pressure of the corresponding compressor,
wherein said control device controls the rotational speed of the compressor in the first stage among said plurality of compressors using said deviation, receives a pressure signal from said pressure detector provided for each compressor on and after the second stage among said plurality of compressors for detecting a discharge pressure of a compressor in a stage preceding the corresponding compressor or a suction pressure of the corresponding compressor, and controls the rotational speed of each compressor on and after the second stage among said plurality of compressors based on a discharge pressure of the compressor in a stage preceding the corresponding compressor or a suction pressure of the corresponding compressor.

2. The multi-stage variable speed compressor according to claim 1, wherein said control device calculates the rotational speed of the first stage compressor among said plurality of compressors from said deviation by PID operation.

3. The multi-stage variable speed compressor according to claim 1, wherein said control device calculates the rotational speed of each compressor on and after the second stage among said plurality of compressors from a discharge pressure of the compressor in a stage preceding the corresponding compressor or a suction pressure of the corresponding compressor by PID operation.

4. The multi-stage variable speed compressor according to claim 1, wherein said control device calculates a change rate of the rotational speed of compressor in the first stage among said plurality of compressors, and then determines the rotational speed of each compressor based on said deviation for all of said plurality of compressors if said change rate is larger than a predetermined threshold value, and wherein the relationship between the rotational speeds of respective stages is previously set.

5. The multi-stage variable speed compressor according to claim 1, wherein all or some of suction ports of said plurality of compressors are connected to each other by conduit lines and each of interconnected conduit lines is provided with a control valve.

6. The multi-stage variable speed compressor according to claim 1, wherein said control device automatically stops said multi-stage variable speed compressor when said multi-stage variable speed compressor is operated below the rotational speed at which it can normally operate.

7. A multi-stage variable speed compressor comprising:
a plurality of compressors of which the rotational speeds are individually variable, said plurality of compressors being serially connected to each other so that the working fluid is compressed step by step;
a pressure detector for detecting a discharge pressure of the compressor of the final stage among said plurality of compressors;
a control device for controlling the rotational speeds of said plurality of compressors so that the discharge pressure of the compressor of said final stage among said plurality of compressors is set to a desired target pressure, wherein said control device receives a pressure signal detected by said pressure detector, calculates a deviation between said target pressure and said pressure signal, and individually controls the rotational speeds of said plurality of compressors using said deviation; and a pressure detector for detecting a discharge pressure of a corresponding compressor, for all of compressors except the final stage compressor among said plurality of compressors, wherein said control device output controls the rotational speed of a compressor of each stage based on a pressure deviation between a discharge target pressure given to each stage and a pressure from the pressure detector for detecting said discharge pressure of each stage, for all of said plurality of compressors, and wherein said target pressure of discharge pressure given to each stage is determined in relation to said target pressure of discharge pressure of the compressor of the final stage.

8. The multi-stage variable speed compressor according to claim 7, wherein said target pressure of discharge pressure given to each stage is determined using said target pressure of discharge pressure of the compressor of the final stage and the compression ratio of the compressor of each stage.

9. The multi-stage variable speed compressor according to claim 7, wherein all or some of suction ports of said plurality of compressors are connected to each other by conduit lines and each of interconnected conduit lines is provided with a control valve.

10. The multi-stage variable speed compressor according to claim 7, wherein said control device automatically stops said multi-stage variable speed compressor when said multi-stage variable speed compressor is operated below the rotational speed at which it can normally operate.

11. A multi-stage variable speed compressor comprising:

a plurality of compressors of which the rotational speeds are individually variable, said plurality of compressors being serially connected to each other so that the working fluid is compressed step by step;

a pressure detector for detecting a discharge pressure of the compressor of the final stage among said plurality of compressors; and a control device for controlling the rotational speeds of said plurality of compressors so that the discharge pressure of the compressor of said final stage among said plurality of compressors is set to a desired target pressure, wherein said control device receives a pressure signal detected by said pressure detector, calculates a deviation between said target pressure and said pressure signal, and individually controls the rotational speeds of said plurality of compressors using said deviation, wherein said control device determines the rotational speed of each compressor based on said deviation, for all of said plurality number of compressors, wherein the relationship between the rotational speeds of respective stages is previously set, and wherein said control device determines the rotational speed of the compressor of the first stage among said plurality of compressors based on said deviation, and determines the rotational speed of each compressor on and after the second stage among said plurality of compressors based on data that previously set the relationship between the rotational speed of compressor of the first stage and the rotational speed of each compressor on and after the second stage.

12. The multi-stage variable speed compressor according to claim 11, wherein all or some of suction ports of said plurality of compressors are connected to each other by conduit lines and each of interconnected conduit lines is provided with a control valve.

13. The multi-stage variable speed compressor according to claim 11, wherein said control device automatically stops said multi-stage variable speed compressor when said multi-stage variable speed compressor is operated below the rotational speed at which it can normally operate.

* * * * *